Aug. 30, 1949.   H. B. CARBON   2,480,712
FLUID PRESSURE OPERATED VALVE
Filed April 7, 1945   2 Sheets-Sheet 1
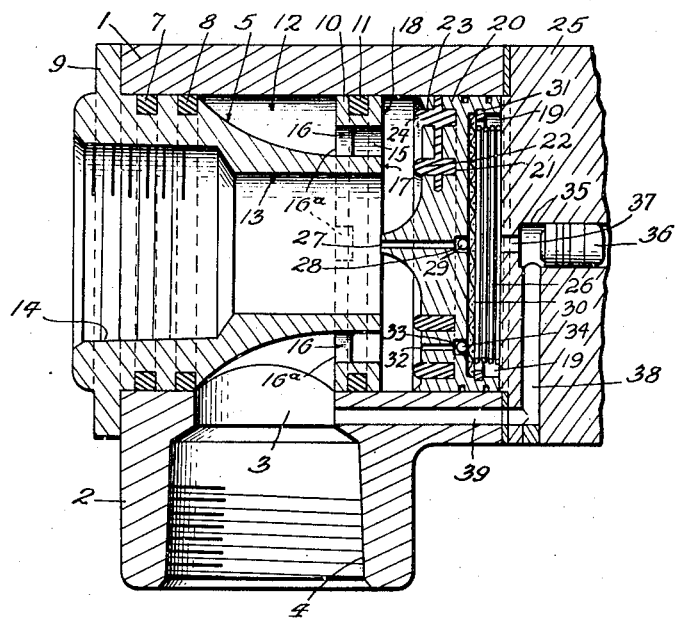
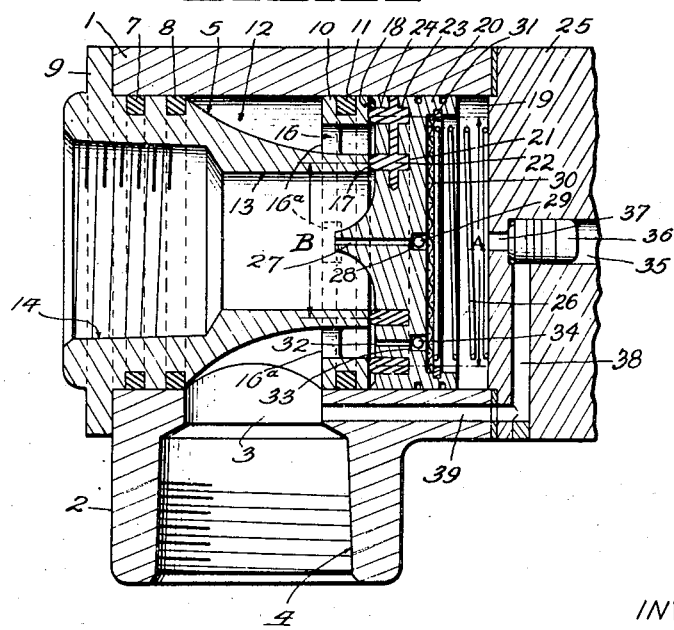
INVENTOR
Harry B. Carbon
BY Mason, Porter & Diller
Attys.

Aug. 30, 1949.      H. B. CARBON      2,480,712
FLUID PRESSURE OPERATED VALVE
Filed April 7, 1945                    2 Sheets-Sheet 2
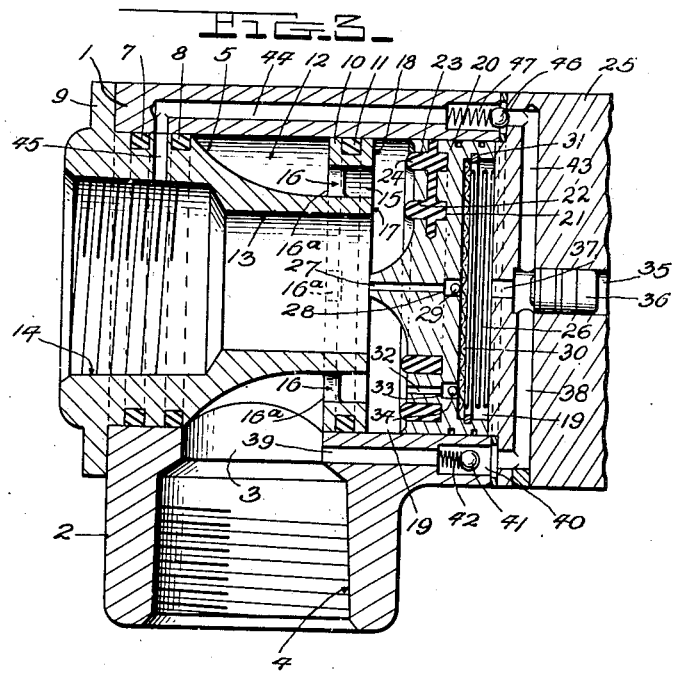
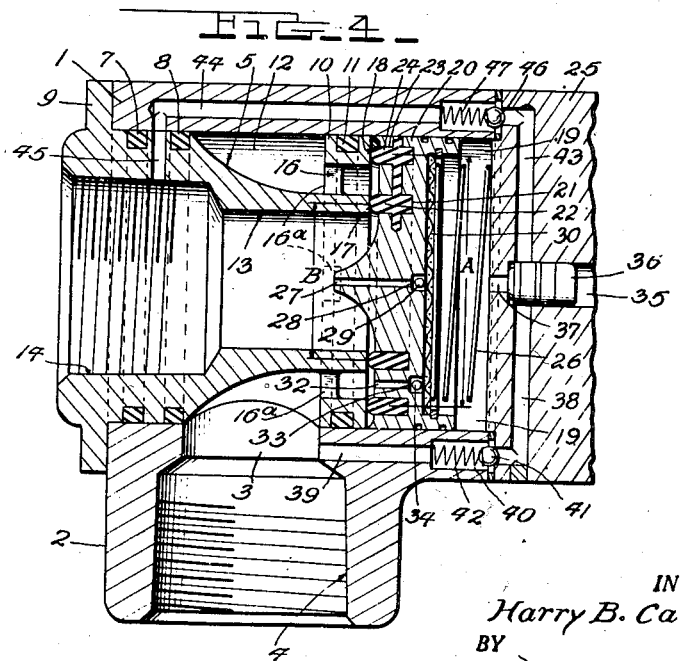
INVENTOR.
Harry B. Carbon
BY Mason, Porter & Diller
Attys Patented Aug. 30, 1949

2,480,712

UNITED STATES PATENT OFFICE 2,480,712

FLUID PRESSURE OPERATED VALVE

Harry B. Carbon, Cleveland, Ohio, assignor to The Parker Appliance Company, Cleveland, Ohio, a corporation of Ohio Application April 7, 1945, Serial No. 587,088

5 Claims. (Cl. 137—139)

The invention relates to new and useful improvements in a fluid pressure operated valve wherein a differential in the fluid pressure on opposite sides of the valve is controlled by a pilot valve.

An object of the invention is to provide a pressure operated valve wherein reverse flow is prevented or automatically checked in the event that the dominant pressure on the inlet side of the valve fails.

A further object of the invention is to provide a valve assembly including a fluid pressure operated valve controlling two ports for the flow of fluid into and out of the valve casing wherein either port may be made the inlet port and the other the outlet port without in any way changing the valve operating mechanism.

In the drawings:

Figure 1 is a longitudinal sectional view through the valve assembly with the pilot valve and the main valve controlled thereby both in open position;

Figure 2 is a view similar to Figure 1 but showing the pilot valve in closed position and the main valve in response thereto having moved to closed position;

Figure 3 is a view similar to Figure 1 but showing certain added features, and with the pilot valve and main valve controlled thereby both in open position;

Figure 4 is a view similar to Figure 3 but showing the pilot valve in closed position and the main valve in response thereto having moved to closed position.

The present invention has to do with improvements in the valve assembly shown and described in the application filed by Arthur L. Parker, deceased, on the fifteenth day of May, 1945, Serial No. 593,795, now Patent No. 2,426,900, granted September 2, 1947.

In the said Parker application the main valve is moved toward and from its seat by a differential in the fluid pressure on opposite sides of the valve. This differential in the fluid pressure is controlled by a pilot valve. One of the improvements embodied in the present valve assembly is a means whereby reverse flow through the valve is prevented or automatically checked in the event that the dominant pressure on the inlet side of the valve fails. The means for accomplishing this purpose is common to the structure shown in all of the figures of the drawings.

Another improvement in the valve assembly includes a means whereby either of the ports leading to the valve chamber may be made an inlet port and the other an outlet port without in any way changing the valve operating mechanism. This feature of construction is present in Figures 3 and 4 only. The features of construction which are common to all of the figures of the drawings will be first described, and similar reference numerals applied thereto.

The valve assembly includes a cylindrical casing 1 having a boss 2 extending radially therefrom and connected to the casing through an opening 3. This boss provides what may be called a fluid port 4 through which fluid may be received into the casing or allowed to flow from the casing.

Extending into the cylindrical casing is an adaptor 5. Said adaptor adjacent the left hand end of the casing as viewed in the drawings, is shaped so as to fit the inner surface of the casing and this connection between the adaptor and the casing is sealed by two ring gaskets 7 and 8. The adaptor has a flange 9 projecting laterally therefrom which is secured to the outer end wall of the casing by any suitable means.

This adaptor extends a considerable distance into the casing and is provided at its inner end with an annular portion 10 which likewise contacts with the inner wall of the cylindrical casing. A gasket 11 seals the connection between this inner end of the adaptor and the casing. The adaptor between the annular portion 10 and the outer end portion thereof is cut away so as to provide a chamber 12 which surrounds the adaptor. This chamber 12 is connected through the opening 3 with the port 4.

The adaptor has a passage 13 therethrough. This passage is enlarged and threaded at the outer end portion and provides a port 14 through which fluid may pass into and through the passage 13, or out from the passage 13. The inner end of the adaptor 5 is provided with an annular channel 15. There are arcuate ports 16 which connect the channel 15 to the cylindrical chamber 12. Between these arcuate ports are radial ribs which are formed integral with the annular portion 10 and the body portion of the adaptor. At the inner side of this channel 15 is a seat 17 and at the outer side is an annular seat 18.

The adaptor terminates short of the right-hand end of the valve casing 1, leaving a space 19 in which a disk valve 20 is mounted for free movement longitudinally of the valve casing. This valve 20 has a free sliding movement with the inner surface of the valve casing. The valve is provided with an annular groove 21 in which is disposed an annular gasket 22, preferably of rubber. This gasket is in alignment with the valve seat 17 so that when the valve is moved to the left as viewed in Figure 1, to the position shown in Figure 2, the gasket which projects from the inner face of the valve will make sealed contact with the valve seat 17.

The valve is also provided with a second annular recess 23 in which is located an annular gasket 24 in alignment with the valve seat 18. This gasket makes sealed contact with the valve seat when the valve is moved to the position shown in Figure 2. There are radially drilled holes in the valve and these gaskets are preferably molded in the recesses and the drilled holes intersecting the recesses will provide connecting portions for the gaskets which serve to hold the gaskets in their respective recesses.

The right-hand end of the valve casing is closed by a head 25. In the chamber 19 between this closure head and the valve is a coil spring 26 which presses the valve toward closed position. The valve has an axial passage 27 at the outer end of which is housing and seat 28 with which is associated a ball 29. A screen 30 is placed against the outer face of the valve and serves to hold the ball 29 in its housing. This screen is held in by means of a snap ring 31.

The valve is also provided with a passage 32 which is disposed between the annular gaskets 22 and 24. This passage 32 has a valve housing and seat 33 at its outer end which is controlled by a ball 34. The ball 34 is held in its housing by means of the screen 30.

The head 25 is provided with a chamber 35 in which is located a pilot valve 36. There is a passage 37 leading from the chamber 35 to the chamber between the outer side of the valve and the inner face of the head 25. There is a passage 38 leading from the chamber 35 which is connected to a passage 39 leading to the opening 3 and the chamber 12. The normal operation of the valve when the pressure on the inlet side is dominant will be briefly described. In Figure 2 both the main valve and the pilot valve are shown in closed position.

When it is desired to pass fluid through the valve, the pilot valve is open. This will connect the chamber or space 19 with the passages 38 and 39 and as these passages are of greater capacity than the passage 27, fluid will flow from the chamber 19 faster than it can be replenished through the passage 27. At this time the ball valve 29 is floating and is retained in its recess by the screen. The ball valve 34 may or may not be seated. The pressure in the chamber 19 will drop so that the pressure on the area B at the inside of the valve is greater than the pressure on the area A at the outside of the valve and this differential is sufficiently great to cause the valve to move to open position as shown in Figure 1.

When it is desired to stop the flow through the valve casing the pilot valve 36 is moved to closed position, and when in closed position, pressure will build up in the chamber 19 so that the pressure on opposite sides of the valve is at first equalized, in which case the spring will move the valve to closed position. After the valve is seated, the pressure in the chamber 19 operating upon a larger area than the pressure on the inside of the valve will help to hold the valve closed.

Let us assume that both the pilot valve and the main valve are closed (Fig. 2) and for some reason the pressure on the inlet side fails and is dominated by the pressure on the outlet side. Fluid from the outlet side will pass through the passage 32, unseating the check valve 34. The check valve 29 will close and therefore the pressure in the outer chamber 19 bearing on the valve will remain dominant and the valve will remain in closed position.

Let us assume that the pilot valve is open and the main valve in response thereto is in open position as shown in Figure 1, and that for some cause the dominant pressure on the inlet side fails so that the dominant pressure is on the outlet side. Fluid will flow through the passages 39 and 38 into the chamber 19, the check valve 29 will be closed, and the pressure in the chamber 19 will be dominant over the pressure on the inside of the valve so that the valve will be moved to closed position.

It will be obvious from the above description that the valve is normally controlled by the differential in the pressure exerted on the valve by the fluid pressure on the inlet side. When the pilot valve is closed the valve will move to closed position. When the pilot valve is open, the valve will move to open position. No matter whether the valve is closed or open, if the dominant pressure on the inlet side fails so that the fluid pressure on the outlet side dominates, the valve will be either held closed, if it was in closed position, or will move to closed position if it was open, thus preventing any reverse flow of fluid from the outlet to the inlet.

This means for preventing the reverse flow through the valve is present in the structure shown in all of the figures of the drawings. In Figures 3 and 4 there is the additional feature of structure which permits the port 14 to be made an outlet instead of an inlet and the port 4 to be made an inlet instead of an outlet. The added features of structure will be described briefly.

At the outer end of the passage 39 there is a chamber 40 in which is located a ball valve 41. A spring 42 moves the valve to the right against a seat and closes the connection between the passages 38 and 39. There is also a passage 43 in the closure head 25 which is connected to a passage 44, and the passage 44 is in turn connected to a radial passage 45 extending through the adaptor between the gaskets 7 and 8. At the outer end of the passage 44 is a chamber for a ball check valve 46 which is moved by a spring 47 against a seat so as to close the connection between the passages 43 and 44. The passage 43 is also connected to the chamber controlled by the pilot valve 36.

When the port 14 is the inlet, the dominant fluid pressure on the passages 45 and 44 will move the ball valve 46 into engagement with the seat. When the pilot valve is open, the fluid is free to flow from the chamber 19 through the passages 38 and 39 to the outlet and therefore when the pilot valve is open, the differential pressure on the valve will cause the valve to move to open position. When the pilot valve is closed, the pressure in the chamber 19 will build up so as to equalize the pressure on the inner face of the valve and the spring will move the valve to closed position.

Let us now assume that the port 4 is made the inlet port and that the pilot valve is closed as shown in Figure 4. Fluid pressure through the passage 32 will build up a pressure in the chamber 19 which will seat the valve. The check valve 29 will be closed at this time.

Let us again assume that the pilot valve is moved to open position as shown in Figure 3. The check valve 41 will be closed and fluid will pass through the passage 32 into the chamber 19, but more slowly than the fluid will escape from said chamber 19 through the passages 43, 44 and 45 to the outlet side. The fluid pressure therefore on the inside of the valve will be greater than the pressure on the outside of the valve and of sufficient extent so as to hold the valve in open position.

Let us again assume that the valve is in closed position and that the port 4 is the inlet port and that for some reason the dominant pressure on the inlet port fails so that the dominant pressure is on the outlet side. The dominant pressure on the outlet side will cause fluid to pass through the passage 27 into the chamber 19 and the check valve 36 will be closed. Thus a pressure is built up in the chamber 19 which is greater than the pressure bearing on the area B and the valve will be held closed.

If the pilot valve should be in open position when the dominant pressure on the inlet connected to the port 4 fails, a reverse flow through the valve will not be stopped as in the construction shown in Figures 1 and 2. If the pilot valve is open when the pressure becomes dominant on the outlet connected to the port 14, then the passages 38 and 39 will connect the chamber 19 to the low pressure side of the valve and the valve will remain in open position.

From the above it is apparent that a valve assembly has been provided wherein fluid pressure controlled by a pilot valve operates to move the main valve to either closed or open position. It will also be apparent that in all forms of the structure shown, when the port 14 is made the inlet and the port 4 is made the outlet, reverse flow through the valve is prevented when the pressure on the inlet fails and the pressure on the outlet becomes dominant. It is also apparent that the valve mechanism as shown in Figures 3 and 4 is so constructed that either the port 14 or the port 4 may be made the inlet port without changing any of the mechanical structure of the valve.

It is obvious that many changes in the details of construction may be made without departing from the spirit of the invention as set forth in the appended claims.

I claim:

1. A valve assembly comprising a casing having inlet and outlet ports, a valve seat associated with one of said ports, a main valve in said casing movable toward and from said seat and forming in said casing a movable wall of an outer closed chamber, said main valve having a central passage therethrough, a check valve for preventing the flow of fluid from the outer chamber to the inlet, said valve having a second passage therethrough disposed so as to connect said outer chamber with the outlet and a check valve in said passage for preventing the flow of fluid from the chamber to the outlet, and means including a pilot valve for controlling the differential in the fluid pressure upon opposite sides of the valve.

2. A valve assembly comprising a casing having inlet and outlet ports, a valve seat associated with one of said ports, a main valve in said casing movable toward and from said seat and forming in said casing a movable wall of an outer closed chamber, said main valve having a central passage therethrough, a check valve for preventing the flow of fluid from the outer chamber to the inlet, said valve having a second passage therethrough disposed so as to connect said outer chamber with the outlet and a check valve in said passage for preventing the flow of fluid from the chamber to the outlet, said casing having an independent passage connecting the outer chamber to the outlet side of the valve, and a pilot valve for opening and closing said passage.

3. A valve assembly comprising a casing, an adaptor extending into the casing and dividing the same into inner and outer fluid chambers having independent ports connected thereto, said adaptor having at its inner end spaced valve seats with ports therebetween connecting the chambers, said casing having a valve chamber at the inner end of the adaptor, a main valve mounted in said chamber for free movement toward and from said seats, a spring in said chamber for moving the valve toward its seat, said main valve having a central passage therethrough, a check valve controlling the fluid flow from the outside inwardly through said passage, said valve having a passage therethrough disposed in a line between the valve seats, and a check valve for controlling the fluid flow from the outside of the valve inwardly through said passage, and means including a pilot valve for controlling the differential in the fluid pressure upon opposite sides of the valve for causing said valve to open when the pilot valve is open and for closing said valve when the pilot valve is closed.

4. A valve assembly comprising a casing, an adaptor extending into the casing and dividing the same into inner and outer fluid chambers having independent ports connected thereto, said adaptor having at its inner end spaced valve seats with ports therebetween connecting the chambers, said casing having a valve chamber at the inner end of the adaptor, a main valve mounted in said chamber for free movement toward and from said seats, a spring in said chamber for moving the valve toward its seat, said main valve having a central passage therethrough, a check valve controlling the fluid flow from the outside inwardly through said passage, said valve having a passage therethrough disposed in a line between the valve seats, a check valve for controlling the fluid flow from the outside of the valve inwardly through said passage, a passage connecting the valve chamber at the outer side of the valve with the outlet, and a pilot valve for controlling said passage whereby when said pilot valve is closed the differential in the pressure on the main valve will close said valve and when said pilot valve is open the differential in the pressure on the main valve will open the same.

5. A valve assembly comprising a casing, an adaptor extending into the casing and dividing the same into inner and outer fluid chambers having independent ports connected thereto, said adaptor having at its inner end spaced valve seats with ports therebetween connecting the chambers, said casing having a valve chamber at the inner end of the adaptor, a main valve mounted in said chamber for free movement toward and from said seats, a spring in said chamber for moving the valve toward its seat, said main valve having a central passage therethrough, a check valve controlling the fluid flow from the outside inwardly through said passage, said valve having a passage therethrough disposed in a line between the valve seats, a check valve for controlling the fluid flow from the outside of the valve inwardly through said passage, a passage connecting said valve chamber at the outer side of the valve with the outlet, a second passage connecting the valve chamber at the outer side of the valve with the inlet, a check valve in each passage for preventing the flow of fluid back into the valve chamber, and a pilot valve for controlling both of said passages whereby when said pilot valve is closed the differential in pressure on the main valve will close the same and when the pilot valve is open the differential in pressure on the main valve will open said valve.

HARRY B. CARBON.

REFERENCES CITED

The following references are of record in the file of this patent:

UNITED STATES PATENTS

| Number | Name | Date |
|---|---|---|
| 212,704 | Jennings | Feb. 25, 1879 |
| 493,774 | Howes | Mar. 21, 1893 |
| 506,145 | Young | Oct. 3, 1893 |
| 570,727 | Gale | Nov. 3, 1896 |
| 1,062,868 | Williams | May 27, 1913 |
| 1,937,044 | Miller | Nov. 28, 1933 |
| 1,942,837 | Schultheiss | Jan. 9, 1934 |
| 2,066,086 | Wilson | Dec. 29, 1936 |
| 2,211,237 | Langdon | Aug. 13, 1940 |